United States Patent
Mitlitsky et al.

(10) Patent No.: US 7,128,103 B2
(45) Date of Patent: Oct. 31, 2006

(54) HYDROGEN FUELING SYSTEM

(75) Inventors: Fred Mitlitsky, Livermore, CA (US); John F. Boyle, Emmaus, PA (US); Luke T. Dalton, Portland, CT (US); Blake Myers, Livermore, CA (US); Hassan Obahi, West Springfield, MA (US); Jason K. Shiepe, Middletown, CT (US)

(73) Assignee: Proton Energy Systems, Inc., Wallingford, CT (US)

( * ) Notice: Subject to any disclaimer, the term of this patent is extended or adjusted under 35 U.S.C. 154(b) by 415 days.

(21) Appl. No.: 10/248,479

(22) Filed: Jan. 22, 2003

(65) Prior Publication Data

US 2003/0175564 A1 Sep. 18, 2003

Related U.S. Application Data

(60) Provisional application No. 60/319,088, filed on Jan. 22, 2002, provisional application No. 60/350,639, filed on Jan. 22, 2002.

(51) Int. Cl.
*B65B 1/04* (2006.01)
(52) U.S. Cl. .................... 141/248; 141/82; 141/83; 141/197; 62/50.2
(58) Field of Classification Search ............ 141/18, 141/21, 69, 70, 82, 83, 94, 95, 98, 100–107, 141/192, 197, 234, 236, 248; 62/50.1–50.5; 137/255, 263; 123/525, 527; 48/190–192
See application file for complete search history.

(56) References Cited

U.S. PATENT DOCUMENTS

| | | | |
|---|---|---|---|
| 4,002,553 A | 1/1977 | Arntz | |
| 4,528,614 A | 7/1985 | Shariff et al. | |
| 4,625,627 A | 12/1986 | Livanos et al. | |
| 4,963,235 A | 10/1990 | Brattan et al. | 204/98 |
| 5,138,522 A | 8/1992 | Kojima et al. | |
| 5,238,030 A | 8/1993 | Miller et al. | |
| 5,365,981 A | 11/1994 | Peschka et al. | 141/7 |
| 5,409,046 A * | 4/1995 | Swenson et al. | 141/11 |
| 5,542,459 A | 8/1996 | Price et al. | 141/18 |
| 5,771,946 A | 6/1998 | Kooy et al. | 141/82 |
| 5,779,866 A | 7/1998 | Tarancon | 204/262 |
| 5,800,258 A | 9/1998 | Knoop et al. | |
| 5,884,675 A * | 3/1999 | Krasnov | 141/18 |
| 5,980,726 A | 11/1999 | Moulthrop, Jr. et al. | 205/637 |

(Continued)

FOREIGN PATENT DOCUMENTS

FR 2773822 7/1999

(Continued)

OTHER PUBLICATIONS

Kountz "Modeling the fast fill process in natural gas vehicle storage cylinders" Institute of Gas Technology pp. 462-469.

(Continued)

*Primary Examiner*—Timothy L. Maust
(74) *Attorney, Agent, or Firm*—Cantor Colburn LLP (57) ABSTRACT

Disclosed herein are an electrochemical system, a hydrogen gas fueling system, a cascade system, and methods for using the same. The hydrogen gas fueling system comprises a multiple-stage compressor disposed in fluid communication with a hydrogen gas source, the compressor configured to cool hydrogen gas received at a stage of the compressor, a cascade section comprising at least two hydrogen gas storage zones disposed in fluid communication with the compressor at the outlet of the compressor, and a hydrogen gas dispensing section disposed in fluid communication with the cascade section.

19 Claims, 4 Drawing Sheets

U.S. PATENT DOCUMENTS

| | | | |
|---|---|---|---|
| 5,983,962 | A | 11/1999 | Gerardot |
| 6,182,717 | B1 | 2/2001 | Yamashita |
| 6,289,692 | B1 | 9/2001 | Houser et al. ............... 62/613 |
| 6,432,283 | B1 | 8/2002 | Fairlie et al. |
| 6,468,412 | B1 | 10/2002 | Bryan et al. ............... 205/500 |
| 6,745,801 | B1 | 6/2004 | Cohen et al. |
| 6,755,225 | B1 | 6/2004 | Niedwiecki et al. |
| 6,786,245 | B1 | 9/2004 | Eichelberger et al. |
| 6,810,925 | B1 * | 11/2004 | Graham et al. ............... 141/98 |

FOREIGN PATENT DOCUMENTS

| | | |
|---|---|---|
| WO | WO 00/70262 | 11/2000 |

OTHER PUBLICATIONS

Daney et al. "Hydrogen vehicle fueling station" Advances in Cryogenic Engineering, vol. 41 pp. 1041-1048.

Mitlitsky "Regenerative Fuel Cell Systems R&D" Proceedings of the 1998 DOE Hydrogen Program Review.

"Stuart energy systems—the hydrogen fuel company" www.power-technology.com/contractors/fuel/stuart/index.htm Jan. 11, 2002.

"Five years in the making, $18 million hydrogen procuction/fueling station opens in Munich" www.hfcletter.com/letter/june99/feature.html Jan. 11, 2002.

"Bus Fueler Ideal for buses and trucks" www.stuartenergy.com.

"Station Components" www.stuartenergy.com/products/dp_stationcomponents.asp Jan. 11, 2002.

Japanese Patent Application No.: JP 2001130901; Publication Date: May 15, 2001; Abstract Only (1page).

Japanese Patent Application No. JP 19930153144; Publication Date: Jan. 17, 1995; Abstract Only (1 page).

European Search Report; European Patent App;ication No.: 03001164.7-2119-; Dated: Aug. 14, 2003; 3 pages.

European Search Report; European Patent Application No.: 03001163.9-2119-; Dated Jun. 11, 2003; 4 pages.

* cited by examiner

HYDROGEN FUELING SYSTEM

CROSS REFERENCE TO RELATED APPLICATIONS

This non-provisional application claims priority to U.S. Provisional Patent Application Ser. No. 60/319,088 filed Jan. 22, 2002, and to U.S. Provisional Patent Application Ser. No. 60/350,639 filed Jan. 22, 2002, both of which are incorporated herein in their entirety.

BACKGROUND

This disclosure relates to electrochemical cells, and, more particularly, to a hydrogen fueling system that preferably comprises a cascading system.

Figure 1:
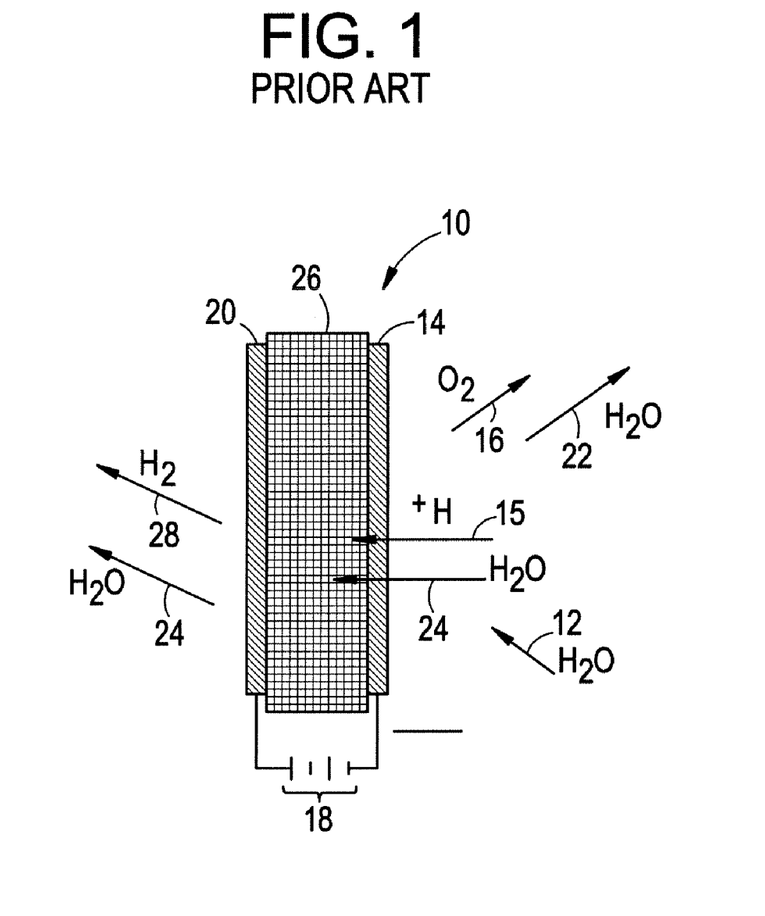
FIG. 1 is a schematic representation of an anode feed electrolysis cell of the prior art.

Electrochemical cells are energy conversion devices, usually classified as either electrolysis cells or fuel cells. Proton exchange membrane electrolysis cells can function as hydrogen generators by electrolytically decomposing water to produce hydrogen and oxygen gases. Referring to FIG. 1, a section of an anode feed electrolysis cell of the prior art is shown generally at 10 and is hereinafter referred to as "cell 10." Reactant water 12 is fed into cell 10 at an oxygen electrode (anode) 14 to form oxygen gas 16, electrons, and hydrogen ions (protons) 15. The chemical reaction is facilitated by the positive terminal of a power source 18 connected to anode 14 and the negative terminal of power source 18 connected to a hydrogen electrode (cathode) 20. Oxygen gas 16 and a first portion 22 of water are discharged from cell 10, while the protons 15 and second portion 24 of the water migrate across a proton exchange membrane 26 to cathode 20. At cathode 20, hydrogen gas 28 is formed and removed, generally through a gas delivery line. Second portion 24 of water, which is entrained with hydrogen gas, is also removed from cathode 20.

An electrolysis cell system may include a number of individual cells arranged in a stack with reactant water being directed through the cells via input and output conduits formed within the stack structure. The cells within the stack are sequentially arranged, and each one includes a membrane electrode assembly defined by a proton exchange membrane disposed between a cathode and an anode. The cathode, anode, or both may be gas diffusion electrodes that facilitate gas diffusion to the proton exchange membrane. Each membrane electrode assembly is in fluid communication with a flow field positioned adjacent to the membrane electrode assembly. The flow fields are defined by structures that facilitate fluid movement and membrane hydration within each individual cell.

The second portion of water, which is entrained with hydrogen gas, is discharged from the cathode side of the cell and is fed to a phase separation unit to separate the hydrogen gas from the water, thereby increasing the hydrogen gas yield and the overall efficiency of the cell in general. The removed hydrogen gas may be fed directly to a unit for use as a fuel. Alternately, the removed hydrogen gas may be fed to a storage facility, e.g., a cylinder, a tank, or a similar type of containment vessel for its subsequent use as a fuel.

If the hydrogen gas is fed to a storage facility, it may be compressed to more economically utilize space and/or to facilitate its transport. Compression may also be necessary if the final pressure at which the gas is to be utilized is greater than the pressure at which the gas is generated. In such a case, the gas should be generated, compressed to a high pressure, and stored at the high pressure for subsequent use.

While existing electrolysis cell systems are suitable for their intended purposes, there still remains a need for improvements, particularly regarding the storage and dispensing of hydrogen gas at pressures greater than the pressures at which the gas is generated. Therefore, a need exists for an electrolysis cell system that is capable of generating, effectively compressing, storing, and dispensing the gas for final use as a fuel.

SUMMARY

Disclosed herein are an electrochemical system, a hydrogen gas fueling system, a cascade system, and methods for using the same. The hydrogen gas fueling system comprises a multiple-stage compressor disposed in fluid communication with a hydrogen gas source, the compressor configured to cool hydrogen gas received at a stage of the compressor, a cascade section comprising at least two hydrogen gas storage zones disposed in fluid communication with the compressor at the outlet of the compressor, and a hydrogen gas dispensing section disposed in fluid communication with the cascade section.

In one embodiment, the method of compressing hydrogen gas comprises: receiving the hydrogen gas at a first stage of the compressor, cooling the hydrogen gas at the first stage, receiving the hydrogen gas at a second stage of the compressor, cooling the hydrogen gas at the second stage, exhausting the hydrogen gas from the second stage, and cooling the exhausted hydrogen gas.

In one embodiment, the electrolysis cell system comprises: a cell, a water source disposed in fluid communication with the cell, an electrical source disposed in electrical communication with the cell, and a cascade section disposed in fluid communication with the cell, the cascade section comprising a piping network configured to distribute fluid to a first storage zone, the first storage zone being in fluid communication with a second storage zone.

In one embodiment, the cascade system comprises: a first zone disposed in fluid communication with a compressor configured to receive a fluid stream from a hydrogen gas source, the fluid communication being such that the fluid stream is receivable from the compressor in response to a first control signal transmitted to a first controllable valve at the first zone, and a second zone disposed in fluid communication with the compressor and with the first zone, the fluid communication being such that a fluid stream is receivable from the compressor and from the first zone in response to a second control signal transmitted to a second controllable valve at the second zone.

In one embodiment, the method for storing and dispensing hydrogen comprises: compressing the hydrogen gas in a compressor, passing the compressed hydrogen gas to a cascade system comprising at least two zones in fluid communication with the compressor via an inlet valve, controlling the inlet valve based upon a first sensed system parameter, dispensing the hydrogen gas from the cascade section through an outlet valve, and controlling the outlet valve based upon a second sensed system parameter, wherein when a zone pressure in a first zone from which the hydrogen gas is being dispensed decreases to below a desired dispensing pressure, dispensing ceases from the first zone and commences from a second zone.

In one embodiment, the storage medium encoded with a machine readable computer program code, said code including instructions for causing a computer to implement a method for storing and dispensing hydrogen gas, the method comprising: compressing the hydrogen gas in a compressor, passing the compressed hydrogen gas to a cascade system comprising at least two zones in fluid communication with the compressor via an inlet valve, controlling the inlet valve based upon a first sensed system parameter, dispensing the hydrogen gas from the cascade section through an outlet valve, and controlling the outlet valve based upon a second sensed system parameter, wherein when a zone pressure in a first zone from which the hydrogen gas is being dispensed decreases to below a desired dispensing pressure, dispensing ceases from the first zone and commences from a second zone.

The above described and other features are exemplified by the following figures and detailed description.

BRIEF DESCRIPTION OF THE DRAWINGS

Referring now to the Figures, which are exemplary embodiments, and wherein the like elements are numbered alike.

DETAILED DESCRIPTION

A cascade system (e.g., a fluid distribution network defined by a piping arrangement) can be employed in a fluid storage and dispensing system. In the cascading system, pressure differentials across the inlets and outlets of the cascading system (as well as across various storage zones within the cascading system) typically provide the driving force for the movement of the hydrogen gas from the storage zones to a dispensing unit for delivery to a hydrogen-powered application. For example, hydrogen gas is dispensed to a receiving vessel first from one of a series of storage tanks. If the pressure in the receiving vessel equalizes with the pressure in the storage tanks at a pressure below the desired pressure, a sequential valve then connects the receiving vessel to a second storage tank, which contains the gas at higher pressure. If necessary, this process is repeated using a third tank. During dispensing, articulation of a valve determines, based on the pressures in each tank, which storage tank the hydrogen gas should be dispensed from. Mass flow sensors typically monitor the total amount of gas dispensed from the tanks.

Figure 2:
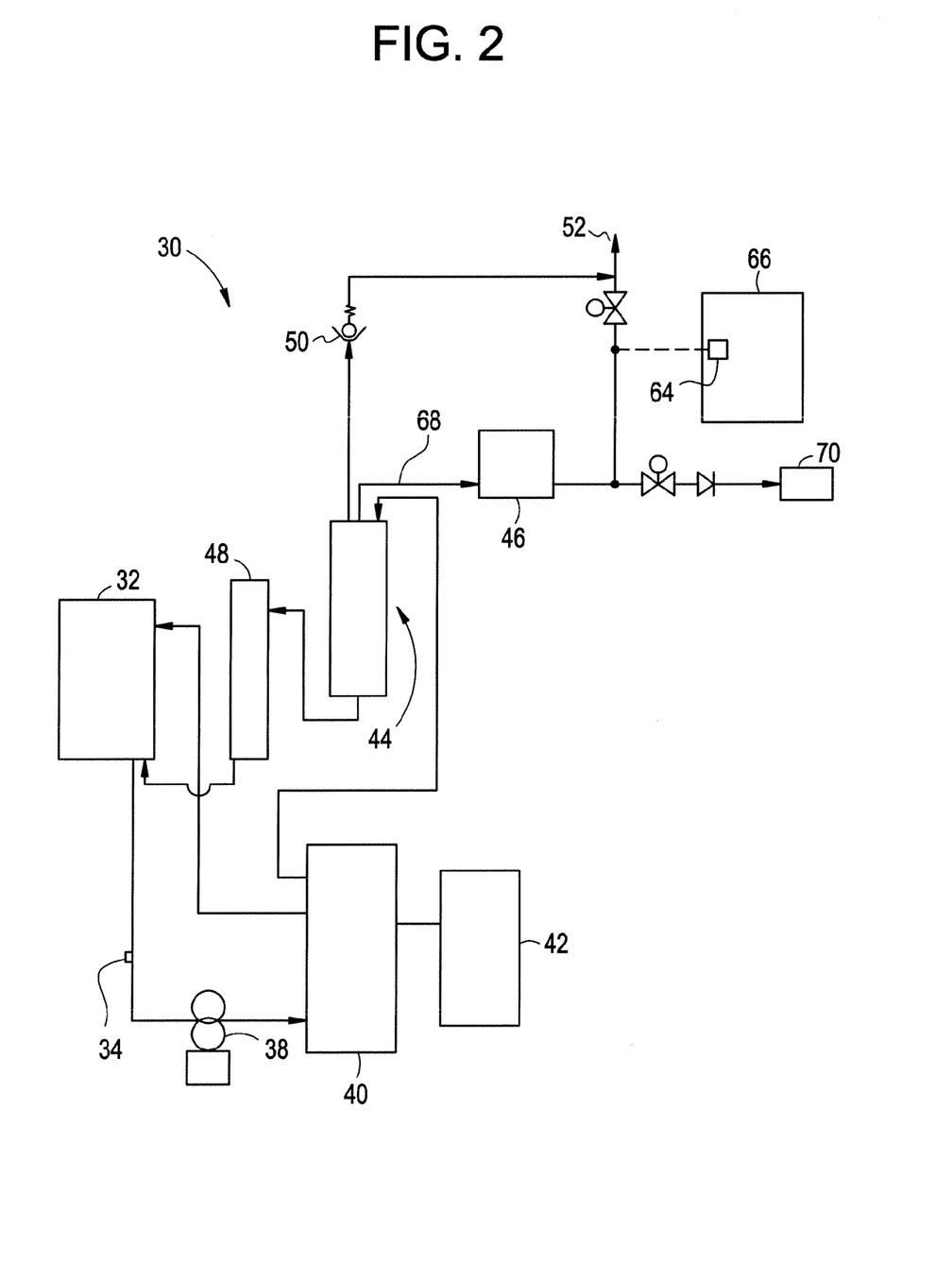
FIG. 2 is a schematic representation of an electrolysis cell system in which hydrogen gas can be generated.

Referring to FIG. 2, an exemplary embodiment of a hydrogen gas source is an electrolysis cell system, which is shown generally at 30 and is hereinafter referred to as "system 30." System 30 may be generally suitable for generating hydrogen for use as a fuel or for various other applications. While the improvements described below are described in relation to an electrolysis cell, the improvements are applicable to both electrolysis and fuel cells. Furthermore, although the description and Figures are directed to the production of hydrogen and oxygen gas by the electrolysis of water, the apparatus is applicable to the generation of other gases from other reactant materials.

System 30 includes a water-fed electrolysis cell capable of generating hydrogen gas from reactant water. The reactant water utilized by system 30 is stored in a water source 32 and is fed by gravity or pumped through a pump 38 into an electrolysis cell stack 40. The supply line, which is preferably clear, plasticizer-free tubing, includes an electrical conductivity sensor 34 disposed therewithin to monitor the electrical potential of the water, thereby determining its purity and ensuring its adequacy for use in system 30.

Cell stack 40 comprises a plurality of cells similar to cell 10 described above with reference to FIG. 1 that are encapsulated within sealed structures (not shown). The reactant water is received by manifolds or other types of conduits (not shown) that are in fluid communication with the cell components. An electrical source 42 is disposed in electrical communication with each cell within cell stack 40 to provide a driving force for the dissociation of the water. Electrical source 42 is in operative communication with a cell control system (not shown) that controls the operation of system 30.

Oxygen and water exit cell stack 40 via a common stream that recycles the oxygen and water to water source 32 where the oxygen is vented to the atmosphere. The hydrogen stream, which is entrained with water, exits cell stack 40 and is fed to a hydrogen/water separation apparatus 44, hereinafter referred to as "separator 44," where the gas and liquid phases are separated. The exiting hydrogen gas (having a lower water content than the hydrogen stream to separator 44) is further dried at a drying unit 46, which may be, for example, a diffuser, a pressure swing absorber, desiccant, or the like. This wet hydrogen stream can have a pressure of about 1 pounds per square inch (psi) up to and exceeding about 20,000 psi. Preferably the hydrogen stream pressure is about 1 psi to about 10,000 psi, with a pressure of about 100 psi to about 6,000 psi preferred, a pressure of about 1,500 psi to about 2,500 psi more preferred for some applications, and a pressure of about 100 psi to about 275 psi more preferred for other applications.

Water with trace amounts of hydrogen entrained therein is returned to water source 32 from separator 44 through a low-pressure hydrogen separator 48. Low pressure hydrogen separator 48 allows hydrogen to escape from the water stream due to the reduced pressure, and also recycles water to water source 32 at a lower pressure than the water exiting separator 44. Separator 44 also includes a release 50, which may be a relief valve, to rapidly purge hydrogen to a hydrogen vent 52 when the pressure or pressure differential exceeds a pre-selected limit.

Pure hydrogen 68 from drying unit 46 is fed to a fueling system 70 disposed in fluid communication with system 30, optionally through a compressor 94. Fueling system 70 is a fluid distribution system that allows for the transfer of hydrogen gas from the generation site (system 30) to the application site. Fueling system 70 may be remotely located with respect to system 30, or it may be part of and disposed in physical contact and direct fluid communication with system 30 (e.g., it may be located at a single site as one complete system, as opposed to located at separate sites where the hydrogen is shipped (e.g., trucked, or the like) from the system 30 to the fueling system 70).

A hydrogen output sensor 64 is incorporated into system 30 to monitor the hydrogen pressure. Hydrogen output sensor 64 can be any suitable output sensor including, but not limited to, a flow rate sensor, a mass flow sensor, or any other quantitative sensing device such as a pressure transducer that converts the gas pressure within the hydrogen line to a voltage or current value for measurement. Hydrogen output sensor 64 is interfaced with a transmitter 66, which is capable of converting the voltage or current value into a pressure reading. A display (not shown) may be disposed in operable communication with transmitter 66 to provide a reading of the pressure, for example, at the location of hydrogen output sensor 64 on the hydrogen line. Transmitter 66 is any suitable converting device, such as an analog circuit, a digital microprocessor, or the like, capable of converting a sensor signal into a displayable value.

Figure 3:
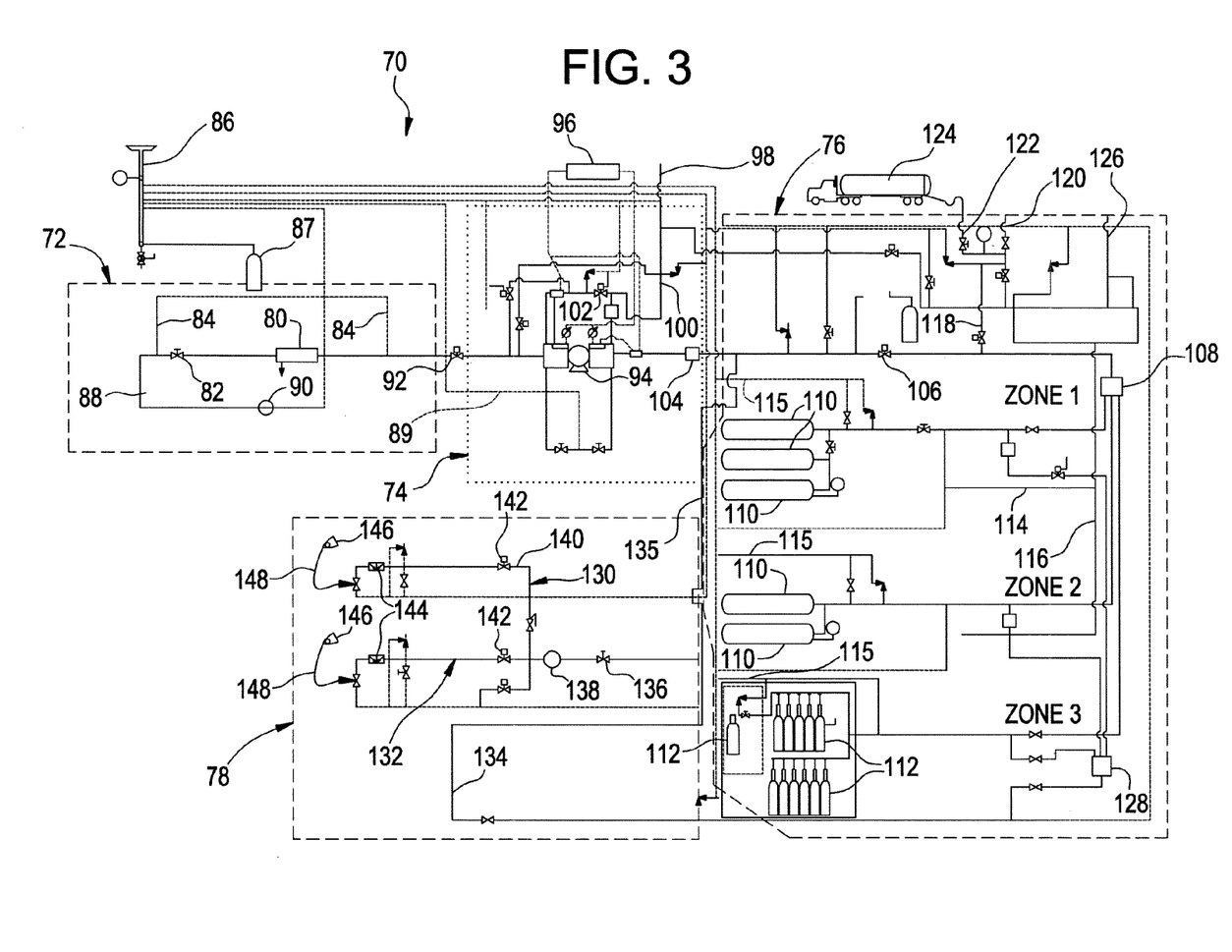
FIG. 3 is a schematic representation of a hydrogen fueling system that may be disposed in fluid communication with the electrolysis cell system of FIG. 2.

Referring now to FIG. 3, one exemplary embodiment of a fueling system is shown schematically at 70. Fueling system 70 receives the hydrogen gas 68 generated by the electrolytic decomposition of water, optionally compresses the hydrogen gas, and cascades it through a distribution network and a storage facility for subsequent delivery to hydrogen-powered apparatuses (e.g., motor vehicles, and the like) at usable pressures. Fueling system 70 can comprise various modularly connectable components, viz., a receiving section 72, a compression section 74, a cascade section 76, and a hydrogen gas dispensing section 78 disposed in fluid communication with each other. At least receiving section 72 and compression section 74 can be maintained in closed-loop control with hydrogen output sensor 64 (shown in FIG. 2) to supply hydrogen gas at hydrogen gas dispensing section 78.

In closed-loop control of the system 70, sensed system parameters are utilized to adjust system outputs. At least one of the sensed system parameters comprises a controlled variable that is measured and utilized to manipulate associated process variables. In fueling system 70, the controlled variable is preferably the hydrogen pressure as sensed by the hydrogen output sensor. Based on such a pressure, process variables (e.g., the flow rate of the hydrogen gas to compression section 74, power inputs to compression section 74, and cooling stream flow rates to compression section 74) are manipulated to deliver compressed hydrogen gas to dispensing section 78. The control of the controlled variable and the manipulation of the process variables allow the system to be regulated and ensure that the process variables converge on steady state values when the controlled variable fluctuates. As such, instability of fueling system 70 is eliminated or at least substantially reduced and a sufficient supply of hydrogen gas can be continuously delivered at hydrogen gas dispensing section 78.

The hydrogen gas is received from the electrolysis cell system in receiving section 72. Receiving section 72 includes a suction tank 80, an actuator valve 82 disposed at the inlet of suction tank 80, and purge lines 84 optionally disposed at the inlet and the outlet of suction tank 80. Suction tank 80 can be a vessel operated at a pressure that varies between atmospheric and the maximum pressure produced by the hydrogen generator to accumulate hydrogen gas from the electrolysis cell system. Actuator valve 82 is responsive to sensed system parameters and regulates the flow rate of hydrogen gas into suction tank 80. Purge lines 84 are in fluid communication with a hydrogen vent 86, which provides fluid communication between the various sections and exhausts excess hydrogen gas from fueling system 70. A tank 87 of inert gas, e.g., helium, nitrogen, or the like, is disposed at hydrogen vent 86 to provide an exhaust mechanism for purge lines 84 (as well as other purge lines disposed in communication with hydrogen vent 86). A takeoff stream 88 disposed at the inlet of suction tank 80 can be employed to monitor the moisture content of hydrogen gas in receiving section 72. The moisture content is determined via a gas analyzer 90 that measures the dew point of the hydrogen gas.

The compression section, shown at 74, is in fluid communication with receiving section 72 through an actuator valve 92 responsive to sensed system parameters to control the flow rate of hydrogen gas into compression section 74. Compression section 74 includes a compressor 94 (e.g., preferably a multistage compressor). Although compressor 94 is shown and described as having two stages, compressor 94 can include any number of stages. Each stage is fluidly communicable with the other stage such that a pressure differential therebetween can be equalized. The stages are also fluidly communicable with hydrogen vent 86 through a purge line 89.

Each stage is furthermore disposed in fluid communication with a heat exchanging device, e.g. a tube-in-tube counterflow-oriented heat-exchanging device (hereinafter "heat exchanger 96"). Heat exchanger 96 removes heat from compressor 94 via fluid flow streams directed to each stage of compressor 94. The fluid flow stream to the first stage is controllable in response to system parameters and pre-cools the hydrogen gas stream to a temperature that enables optimum compression of the gas in the second stage. The fluid flow stream to the second stage, which is also controllable in response to system parameters, further cools the gas in the second stage. Moreover, as the fluid flow stream exits the second stage it cools the compressed hydrogen gas at the compressor outlet. In some instances, this cooling loop can be shared with cooling loops that might be employed for other components in the system, including motors, electronics, and the gas stream near the dispenser. Optimum compression of the hydrogen gas at the second stage, in conjunction with cooling of the compressed gas as it is exhausted from compressor 94, provides for the maximum efficiency and operability of fueling system 70.

Compressor 94 can also be in fluid communication with an external source of hydrogen gas through a receiving port 98. The external source, which may be a vessel containing hydrogen gas pre-disposed therein (e.g., a tube trailer, hydrogen-filled cylinders, or the like) provides a high pressure backup source of hydrogen gas in the event that the electrolysis cell system becomes non-operational or if the load demand exceeds the electric cell capability. (In such an event, the hydrogen pressure as sensed by the hydrogen output sensor is replaced as the controlled variable by the pressure sensed at the external source.) The pressure at which the external source supplies hydrogen gas is up to the rated pressure of the storage unit, and is typically up to about 3,000 psi for readily available storage units. Minor design changes can accommodate storage units that are rated to significantly higher pressures (up to about 20,000 psi), when available. The flow of hydrogen gas through receiving port 98 to compressor 94 is regulated by an actuator valve 100, which may be controllable in response to sensed system parameters, operator input, or a combination of both.

The regulated flow of hydrogen gas from the external source is directed to the second stage of compressor 94. By optionally directing such flow to the appropriate stage of compressor 94, the desired hydrogen pressure can be attained at the outlet of compressor 94. In the event that compressor 94 receives hydrogen gas from the external source, at least a portion of such hydrogen gas may be diverted into the first stage of compressor 94 (optionally subsequent to being cooled by the cooling stream exiting the first stage of compressor 94), in order to bring the gas pressure up to maximum pressure allowable on the fueling apparatus, which is generally higher than the rated pressure of the external source. Diversion of hydrogen gas into the first stage is affected via manipulation of an actuator valve 102 in response to sensed system parameters, operator input, or a combination of both.

Regardless of whether the hydrogen gas stream originates from the electrolysis cell system or from the external source, the compressed gas is exhausted through a filter 104 to cascade section 76 of fueling system 70. The pressure at which the hydrogen gas exits compression section 74 is preferably sufficient to fill storage vessels 110 to a sufficient pressure to enable dispensing of the hydrogen at the desired pressure without additional compressors. For example, in order to attain a pressure of about 6,250 psi exiting dispensing section 78, a pressure of about 6,250 psi to about 20,000 psi from the compression section 74 is preferred, with a pressure of about 6,250 to about 7,250 more preferred, and a pressure of about 6,600 psi especially preferred.

Figure 4:
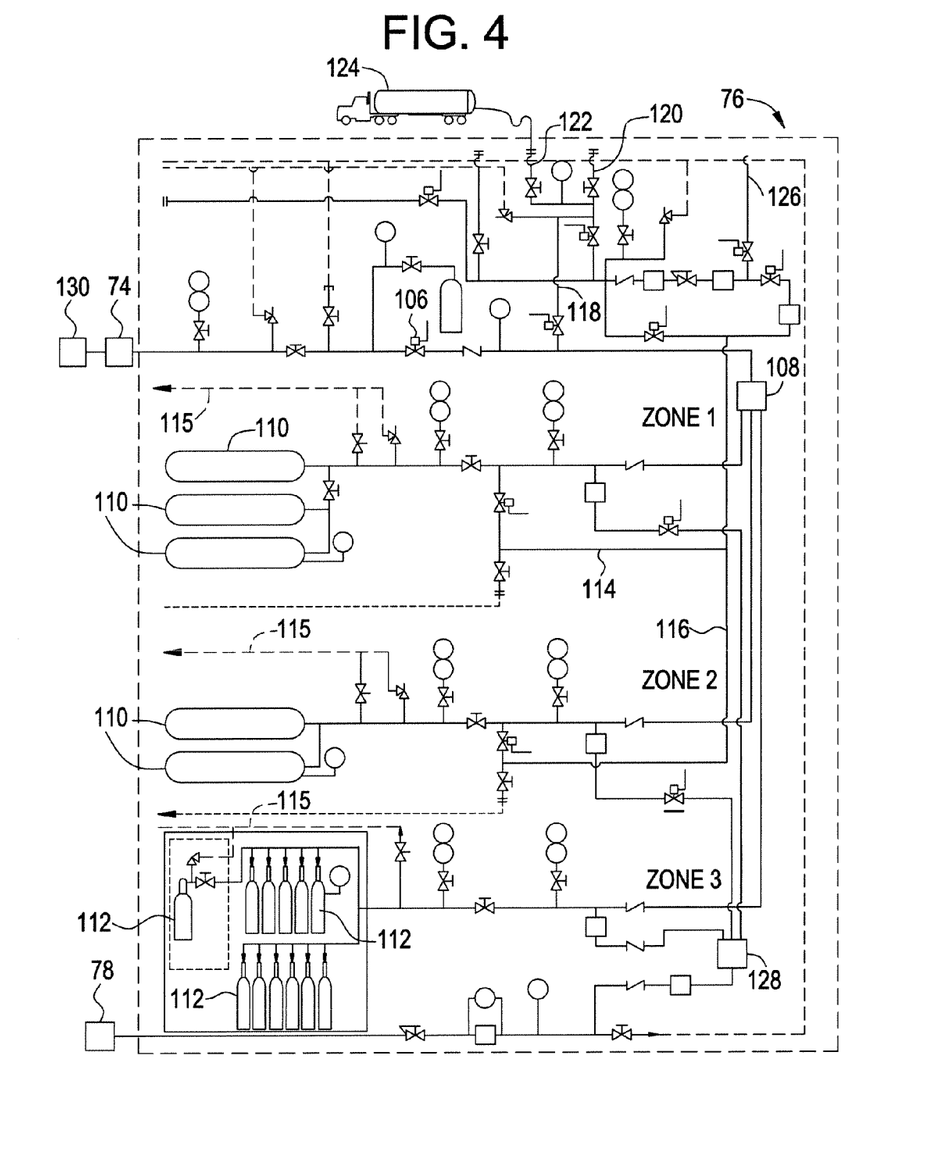
FIG. 4 is an exploded view of cascading system 76 from FIG. 3.

Referring to both FIGS. 3 and 4, the receiving of compressed hydrogen gas by cascade section 76 from compression section 74 can be regulated via an actuator valve 106 responsive to sensed condition parameters. Cascade section 76 provides for the controlled distribution of the compressed hydrogen gas through a piping network. The controlled distribution of the compressed hydrogen gas enables the delivery of the gas to various downstream-located storage zones within cascade section 76.

Upon a flow of compressed hydrogen gas through actuator valve 106, the gas is received at a first priority valve 108. As shown, first priority valve 108 can be a five-way (or other multi-way) valve, which can be made up of multiple valves with fewer ports, and can be controllable in response to an operator (or automated system) input to divert the compressed hydrogen gas into any one of or a combination of the downstream-located storage zones. Once the various zones are filled with a sufficient pressure of hydrogen gas, they are available to fill a compressed gas tank by cascading between the zones. The cascade system enables better gas utilization within the fueling apparatus than would otherwise be possible.

The zones into which the gas is directed may comprise groupings of stationary storage vessels 110 and/or transportable storage vessels 112, with each zone capable of containing gas at the same or a different pressure than the other zone(s) (e.g., the first zone could have a pressure of 5,000 psi, while the second zone has a pressure of 6,500 psi, and, optionally, the first and second zones could be fluidly opened to one another such that the pressures equalize between the zones). In one exemplary embodiment of fueling system 70, cascade section 76 comprises a first zone having ASME (American Society of Mechanical Engineers) regulated stationary storage vessels 110, a second zone having similar or identical ASME regulated stationary storage vessels 110, and a third zone having DOT (Department of Transportation) regulated transportable storage vessels 112. Each zone is fluidly communicable with hydrogen vent 86 through purge lines 115. Furthermore, the first zone is in fluid communication with the second zone through lines 114 and 116, thereby allowing gas to be freely transported between the first and second zones. Additionally, the ability to move gas between zones by way of the compressor can be affected by reconfiguring the state of one or more valves in the fueling apparatus, and can enable more rapid recovery of the fueling apparatus between dispensing operations (in some instances). This is because the throughput of the compressor can be substantially higher than the throughput of the generator within the fueling apparatus. For example, zone 3 can be configured to be in fluid communication with a compressor that is, in turn, in fluid communication with one or more of the other zones and/or the dispensing unit.

As an alternative to being directed to the storage zones, the compressed hydrogen gas may be removed downstream of actuator valve 106 through a line 118 and directed through an external port 120 to be deposited into a customer's cylinder (not shown), without requiring the detailed interface required for filling through the dispenser, or directed through an external port 122 to be deposited into a tube trailer 124.

A receiving port 126 is also disposed in fluid communication with the first and second zones to enable hydrogen gas to be pumped directly from another external source into the first and/or second zones. Hydrogen gas from the external source received through receiving port 126 may be directed into the first zone through line 114, or it may be directed to the second zone through line 116.

The three zones are each in fluid communication with a second priority valve 128, through which fluid communication is maintained with dispensing section 78. Second priority valve 128 may be identical to or substantially similar to first priority valve 108 described above. Additionally, it is understood that additional zones may be employed, subsequent, prior, or between the zones described above. Furthermore, the terms "first", "second", and "third" are employed for convenience, solely for clarity in distinguishing between different zones.

In order to perform prescribed functions and information processing required for the automatic manipulation of the valves associated with each zone, as well as the computations therefore (e.g., the execution of pressure control algorithm(s), and the like), a controller (not shown) may be disposed in informational communication with cascade system 76. The controller may include, but is not limited to including, a processor(s), computer(s), memory, storage, register(s), timing, interrupt(s), communication interfaces, and input/output signal interfaces, and the like, as well as combinations comprising at least one of the foregoing. For example, the controller may include input signal filtering to enable accurate sampling and conversion of data or acquisitions of such signals from communications interfaces.

One process by which the controller may operate involves controlling the position of priority valves 108, 128 (as well as other valves) in response to various system parameters. The controller receives various input signals including, but not limited to, those identified above, to facilitate such processing and may provide one or more output signals in response. In one embodiment, the controller receives as input signals, e.g., a desired pressure signal representative of the desired gas pressure, the gas pressure signal, and the measured controllable valve position signal. The controller then processes the various input signals and transmits an output controllable valve command. Such a processing of information provides for the effective control of both the filling of the cylinders (which may be manifolded together) and the refilling of the storage tanks by tracking the pressures in the system and optimizing the compressor output to provide the highest system performance.

The cascade section preferably comprises a plurality of zones, with each zone capable of storing hydrogen at the same or different pressures than other zones. Each zone comprises a storage facility for receiving, storing, and dispensing hydrogen. The cascade system preferably comprises valve(s) that are manually or automatically controlled (e.g., based upon sensor readings such as pressure, temperature, and the like). The valves are capable of diverting the hydrogen from the compressor (or directly from the electrolysis cell(s)) to the desired zone for storage, and of diverting hydrogen from the desired zone to the hydrogen dispensing system and/or through the compressor to a different zone or to the hydrogen dispensing system. In order to enable the dispensing of hydrogen at a desired pressure without the use of a compressor, the zones preferably store the hydrogen at a pressure of about 2,000 psi to about 20,000 psi. Storage of the hydrogen in multiple zones, with at least one zone at sufficiently above the desired fill pressure enables the employment of the cascade (e.g., the gases attempt to equalize pressure between the particular zone and the fill tank, followed by reconfiguring the valve states to enable a different zone to attempt to equalize pressure with the fill tank, and continuing until the filling process has completed) and results in better gas utilization within the fueling system than if all of the gas were contained in a single zone. Gas utilization can be further improved in the system by using a compressor to force hydrogen directly from a zone into a region of the system that dispenses hydrogen to the tank being filled during the filling process. The compressor that is optionally used during the fill process in such a fashion can be the same compressor that is used to pressurize the zones or can be a separate device that is possibly optimized for higher throughput. When the hydrogen is generated at high pressure, the number of compressor stages required can be reduced. If the hydrogen in generated at sufficiently high pressure, compressors can be eliminated from the part of the system that pressurizes the zones.

The hydrogen dispensing system disposed in fluid communication with the cascade system and/or directly in fluid communication with the electrolysis cell and/or the compressor, can comprise: one or more dispensing outlets configured to deliver hydrogen to a hydrogen storage tank or the like. For example, the dispensing outlets can comprise a first dispensing outlet and a second dispensing outlet each configured to fill a hydrogen storage tank at different pressures (e.g., one configured to fill a tank to a thermally settled pressure of about 3,600 psi, and the other configured to fill a tank to a thermally settled pressure of about 5,000 psi, or any other combination of pressures desired). For example, the first outlet can be capable of dispensing hydrogen at a pressure of less than or equal to about 4,500 psi, and the second outlet can be capable of dispensing hydrogen at a pressure of less than or equal to about 6,250 psi or so, preferably about 4,750 psi to about 6,250 psi. Additional outlets can be employed having the same or different pressure dispensing capabilities, with dispensing capabilities up to and exceeding pressures of about 20,000 psi envisioned. Each dispensing outlet can optionally have a pressure adjuster that allows the operator to choose the desired pressure to which the storage tank will be filled. The outlet(s) themselves or the dispensing system can further comprise a receiving section with a suction tank and purge lines disposed in fluid communication with a hydrogen vent; a cooling system (e.g., a tube in tube heat exchange, a tube in shell heat exchanger, or the like, through which the hydrogen passes prior to entering the storage tank) capable of cooling the hydrogen prior to entering the storage tank and/or capable of cooling the storage tank; and storage tank temperature sensor(s). Preferably, the outlets comprise a nozzle disposed in breakable communication with the hydrogen dispensing system.

The single or multiple-stage compressor can be employed to both compress to different pressures as well as to cool the hydrogen stream. In one embodiment, the method of using the compressor comprises: receiving hydrogen at a first stage of the compressor; optionally cooling the hydrogen; directing the cooled hydrogen to a second stage of the compressor; optionally cooling the hydrogen in the second stage; exhausting the hydrogen from the second stage; and optionally cooling the exhausted hydrogen gas. A single stage compressor, or one stage of a multi-stage compressor can be employed to both force hydrogen directly from a zone into a region of the system that dispenses hydrogen to the tank being filled during the filling process, as well as to cool the hydrogen stream. The compressor that is optionally used during the fill process in such a fashion can be the same compressor that is used to pressurize the zones or can be a separate device that is possibly optimized for higher throughput.

Of concern to a fueling station operator is the storage effectiveness of the fueling station, which is defined as the fraction of stored gas that can be dispensed at a particular pressure. Storage effectiveness in conjunction with compressor flow rate characteristics determines, for example, the number of vehicles that a fueling station can fill in a given time period. Storage effectiveness can be improved by increasing the gas storage pressure, the number of cascade levels, or both. In particular, it can be incrementally improved in the cascade system by increasing the control and monitoring ability of the system at the stationary storage vessels, as well as at the compressor and cylinder filling manifolds. An exemplary cascade system having three or more zones and being automatically controlled makes the operation of the storage receiver(s) and/or trailers as simple as possible. It allows the stationary storage vessels, the transportable storage vessels, the compressor, and other cylinders to interact in the most efficient manner to maximize product usage and minimize gas product residual and compressor running time.

Hydrogen gas dispensing section 78 comprises a first outlet 130 and a second outlet 132, each being in fluid communication with second priority valve 128 preferably of cascade section 76 through a line 134. Line 134 extending from second priority valve 128 includes a pressure control valve 136 to regulate the flow of hydrogen gas from cascade section 76 and a flow meter 138 to monitor the flow to each outlet 130, 132. Line 134 is further in fluid communication with hydrogen vent 86. Moreover, line 134 extending from second priority valve 128 is optionally disposed in fluid communication with the outlet of compressor section 74 through a bypass line 135, thereby enabling cascade section 76 to optionally be circumvented.

Multiple outlets can be employed with subsequent outlets preferably capable of dispensing the hydrogen at different pressures. For example, first outlet 130 dispenses hydrogen gas at a pressure of about 15 psi and about 20,000 psi, and preferably at about 4,500 psi (e.g., to enable a thermally settled fill of about 3,600 psi), while second outlet 132 dispenses hydrogen gas at a pressure of about 15 psi and about 20,000 psi, and preferably at about 6,250 psi (for example to enable a thermally settled fill of about 5,000 psi). Each outlet 130, 132 comprises a line 140 that includes an actuatable valve 142 controllable in response to sensed system parameters, a breakaway coupling 144, and a nozzle 146. Each breakaway coupling 144 is preferably readily separable from its associated line 140 in the event that a predetermined amount of force is applied at the associated nozzle 146, with each nozzle 146 preferably disposed in fluid communication with its associated line 140 via a flexible hose 148.

In addition to the above components, the system 30 and the fueling system 70 may further include circulation pumps, blowers, check valves, solenoid valves, sensors, controllers, vents, and the like, which may not appear in the drawings but are well known to those skilled in the art.

The hydrogen fueling system can comprise: a compressor (such as a multiple-stage compressor, e.g., a two-stage compressor, or the like) disposed in fluid communication with a hydrogen gas source (e.g., an electrolysis cell/stack, a tube trailer, tanks, other storage vessels, and the like).

Preferably, the compressor design enables thermal transfer between the hydrogen stream being compressed and either a second hydrogen stream passing through the compressor and/or a coolant stream, such that the temperature of the hydrogen gas exiting the compressor is less than or equal to about 10° F. greater than the temperature of the uncompressed hydrogen gas entering the compressor. Disposed in fluid communication with the outlet of the compressor is the cascade system, which, in turn, is in fluid communication with a hydrogen dispensing system. Preferably, the fueling system further comprises a bypass enabling fluid communication directly from the compressor to the hydrogen dispensing system.

Disclosed herein are fluid delivery system, a cascade system, and method for use thereof. The fluid delivery system can comprise: a fluid source (e.g., an electrolysis cell system, a tube trailer, a pipeline, and the like, as well as combinations comprising at least one of the foregoing sources), a compressor in fluid communication with the fluid source (e.g., hydrogen, other gases, liquids, or the like); and a cascade system disposed in fluid communication with an outlet of the compressor, wherein the cascade system comprises a piping network configured to distribute the fluid a series of storage zones. For example, the piping network can distribute the fluid to a first storage zone disposed in fluid communication with an inlet valve that is optionally in operable communication with a controller, and a second storage zone disposed in fluid communication with the inlet valve and with the first storage zone. The storage zones can comprise various combinations of stationary, transportable, and mobile storage vessels of varying sizes and pressure ratings. Between the various zones and between the zones and the compressor and the dispensing unit, various pressure regulators, valves (e.g., check valves, solenoid valves, and the like), sensors (e.g., pressure, temperature, mass flow, and the like), circulation pumps, blowers, controllers, vents, and the like can be employed, as well as elsewhere in the system.

The cascading system described herein can be employed in conjunction with any type of electrolysis cell systems such as proton exchange membrane cells and the like. Hydrogen gas supplied to the system may also be obtained from or supplemented with sources other than electrolysis cell systems such as, e.g., fossil fuels, biomatter, and the like, which are introduced to the system via tube trailers, pipelines, and the like. The cascading system may, furthermore, be utilized without any hydrogen generating apparatus and may receive hydrogen introduced from an external source such as a tube trailer. Regardless of the source of the hydrogen, the cascading system efficiently distributes hydrogen for use in a variety of applications, particularly for motor vehicles to which the hydrogen is generally dispensed at industry-standard pressures.

Modularity of the hydrogen fueling system provides additional advantages over other fluid distribution systems. Each section of the system can be independently assembled and moved to a site where the sections can be connected and operated. Mobility of the system, and particularly each individual section, provides for increased adaptability of the system and further enhances the overall functionality of the system. Mobility may also expedite the siting requirements, since mobile systems are inherently non-permanent.

The disclosed method can be embodied in the form of computer or controller implemented processes and apparatuses for practicing those processes. It can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the method. The method may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the method. When implemented on a general-purpose microprocessor, the computer program code segments configure the microprocessor to create specific logic circuits.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A hydrogen gas fueling system comprising:
   a multiple-stage compressor disposed in fluid communication with a hydrogen gas source, the compressor configured to cool hydrogen gas received at a stage of the compressor, wherein the hydrogen gas source further comprises an electrochemical cell; a water source disposed in fluid communication with the electrochemical cell; and an electrical source disposed in electrical communication with the electrochemical cell;
   a cascade section comprising at least two hydrogen gas storage zones disposed in fluid communication with the compressor at the outlet of the compressor; and
   a hydrogen gas dispensing section disposed in fluid communication with the cascade section.

2. The fueling system of claim 1, wherein the cascade section comprises at least three hydrogen gas storage zones each comprising a pressure vessel configured to store compressed hydrogen at a pressure of about 2,000 psi to about 20,000 psi.

3. The fueling system of claim 1, wherein the hydrogen gas dispensing section comprises a first outlet configured to dispense hydrogen gas at a first pressure and a second outlet configured to dispense hydrogen gas at a second pressure, wherein the first pressure is less than the second pressure.

4. The fueling system of claim 1, wherein the hydrogen gas dispensing section further comprises an outlet comprising a pressure adjuster configured to dispense hydrogen gas at a plurality of pressures.

5. The fueling system of claim 1, further comprising a bypass disposed between the compressor and the dispensing section enabling the cascade section to be bypassed.

6. The fueling system of claim 1, wherein the first pressure is less than or equal to about 4,500 psi, and the second pressure is about 4,750 psi to about 6,250 psi.

7. A hydrogen gas fueling system comprising:
   a multiple-stage compressor disposed in fluid communication with a hydrogen gas source, the compressor configured to cool hydrogen gas received at a stage of the compressor;

a cascade section comprising at least two hydrogen gas storage zones disposed in fluid communication with the compressor at the outlet of the compressor;

a hydrogen gas dispensing section disposed in fluid communication with the cascade section; and a bypass disposed between the compressor and the dispensing section enabling the cascade section to be bypassed.

8. The fueling system of claim 7, wherein the cascade section comprises at least three hydrogen gas storage zones each comprising a pressure vessel configured to store compressed hydrogen at a pressure of about 2,000 psi to about 20,000 psi.

9. The fueling system of claim 7, wherein the hydrogen gas dispensing section comprises a first outlet configured to dispense hydrogen gas at a first pressure and a second outlet configured to dispense hydrogen gas at a second pressure, wherein the first pressure is less than the second pressure.

10. The fueling system of claim 7, wherein the hydrogen gas dispensing section further comprises an outlet comprising a pressure adjuster configured to dispense hydrogen gas at a plurality of pressures.

11. A hydrogen gas fueling system comprising:

a receiving section comprising a suction tank and purge lines disposed in fluid communication with a hydrogen vent;

a multiple-stage compressor disposed in fluid communication with a hydrogen gas source through the receiving section, the compressor configured to cool hydrogen gas received at a stage of the compressor;

a cascade section comprising at least two hydrogen gas storage zones disposed in fluid communication with the compressor at the outlet of the compressor; and a hydrogen gas dispensing section disposed in fluid communication with the cascade section;

wherein the compressor is disposed in a compressor section disposed in fluid communication with the suction tank and the cascade section, the compressor section further comprising a heat exchanger disposed in fluid communication with the compressor; and wherein the cascade section further comprises a piping network at least providing selective fluid communication to a first storage zone, a second storage zone, and a third storage zone.

12. The fueling system of claim 11, wherein the hydrogen gas dispensing section further comprises a first outlet configured to dispense hydrogen gas at a pressure of less than or equal to about 4,500 psi, and a second outlet configured to dispense hydrogen gas at a pressure of about 4,750 psi to about to about 6,250 psi.

13. A hydrogen gas fueling system comprising:

a multiple-stage compressor disposed in fluid communication with a hydrogen gas source, the compressor configured to cool hydrogen gas received at a stage of the compressor, wherein the hydrogen gas source is an electrochemical cell;

a cascade section comprising at least two hydrogen gas storage zones disposed in fluid communication with the compressor at the outlet of the compressor, wherein the at least two hydrogen gas storage zones comprise a first zone is disposed in fluid communication with the compressor configured to receive a fluid stream from a hydrogen gas source, the fluid communication being such that the fluid stream is receivable from the compressor in response to a first control signal transmitted to a first controllable valve at the first zone; and a second zone disposed in fluid communication with the compressor and with the first zone, the fluid communication being such that a fluid stream is receivable from the compressor and from the first zone in response to a second control signal transmitted to a second controllable valve at the second zone; and a hydrogen gas dispensing section disposed in fluid communication with the cascade section.

14. The fueling system of claim 13, further comprising a bypass disposed between the compressor and the dispensing section enabling the cascade section to be bypassed.

15. The fueling system of claim 13, wherein the first pressure is less than or equal to about 4,500 psi, and the second pressure is about 4,750 psi to about 6,250 psi.

16. A hydrogen gas fueling system comprising:

a multiple-stage compressor disposed in fluid communication with a hydrogen gas source, the compressor configured to cool hydrogen gas received at a stage of the compressor;

a cascade section comprising at least two hydrogen gas storage zones disposed in fluid communication with the compressor at the outlet of the compressor; and a hydrogen gas dispensing section disposed in fluid communication with the cascade section, wherein the hydrogen gas dispensing section comprises a first outlet configured to dispense hydrogen gas at a first pressure and a second outlet configured to dispense hydrogen gas at a second pressure, wherein the first pressure is less than the second pressure; and wherein the first pressure is less than or equal to about 4,500 psi, and the second pressure is about 4,750 psi to about 6,250 psi.

17. A hydrogen gas fueling system comprising:

a multiple-stage compressor disposed in fluid communication with a hydrogen gas source, the compressor configured to cool hydrogen gas received at a stage of the compressor;

a cascade section comprising at least two hydrogen gas storage zones disposed in fluid communication with the compressor at the outlet of the compressor; and a hydrogen gas dispensing section disposed in fluid communication with the cascade section;

wherein the at least two hydrogen gas storage zones comprise a first zone is disposed in fluid communication with the compressor configured to receive a fluid stream from a hydrogen gas source, the fluid communication being such that the fluid stream is receivable from the compressor in response to a first control signal transmitted to a first controllable valve at the first zone; and a second zone disposed in fluid communication with the compressor and with the first zone, the fluid communication being such that a fluid stream is receivable from the compressor and from the first zone in response to a second control signal transmitted to a second controllable valve at the second zone; and wherein the compressor, the first zone, and the second zone are configured to receive hydrogen gas.

18. A hydrogen gas fueling system comprising:

a multiple-stage compressor disposed in fluid communication with a hydrogen gas source, the compressor configured to cool hydrogen gas received at a stage of the compressor;

a cascade section comprising at least two hydrogen gas storage zones disposed in fluid communication with the compressor at the outlet of the compressor; and a hydrogen gas dispensing section disposed in fluid communication with the cascade section;

wherein the at least two hydrogen gas storage zones comprise
- a first zone is disposed in fluid communication with the compressor configured to receive a fluid stream from a hydrogen gas source, the fluid communication being such that the fluid stream is receivable from the compressor in response to a first control signal transmitted to a first controllable valve at the first zone; and
- a second zone disposed in fluid communication with the compressor and with the first zone, the fluid communication being such that a fluid stream is receivable from the compressor and from the first zone in response to a second control signal transmitted to a second controllable valve at the second zone; and wherein the second zone further comprises a transportable storage vessel.

19. A hydrogen gas fueling system comprising:

a multiple-stage compressor disposed in fluid communication with a hydrogen gas source, the compressor configured to cool hydrogen gas received at a stage of the compressor;

a cascade section comprising at least two hydrogen gas storage zones disposed in fluid communication with the compressor at the outlet of the compressor; and a hydrogen gas dispensing section disposed in fluid communication with the cascade section;

wherein the at least two hydrogen gas storage zones comprise:
- a first zone is disposed in fluid communication with the compressor configured to receive a fluid stream from a hydrogen gas source, the fluid communication being such that the fluid stream is receivable from the compressor in response to a first control signal transmitted to a first controllable valve at the first zone, wherein the first zone comprises a first grouping of stationary storage vessels disposed in fluid communication with an external hydrogen source through an inlet valve, the inlet valve being controllable in response to a sensed system parameter; and
- a second zone disposed in fluid communication with the compressor and with the first zone, the fluid communication being such that a fluid stream is receivable from the compressor and from the first zone in response to a second control signal transmitted to a second controllable valve at the second zone, wherein the second zone comprises a second grouping of stationary storage vessels disposed in fluid communication with an outlet valve and with the compressor through the inlet valve; and
- a third zone a first grouping of transportable storage vessels disposed in fluid communication with the outlet valve and with the compressor through the inlet valve.

* * * * *